United States Patent Office 3,363,123
Patented Jan. 9, 1968

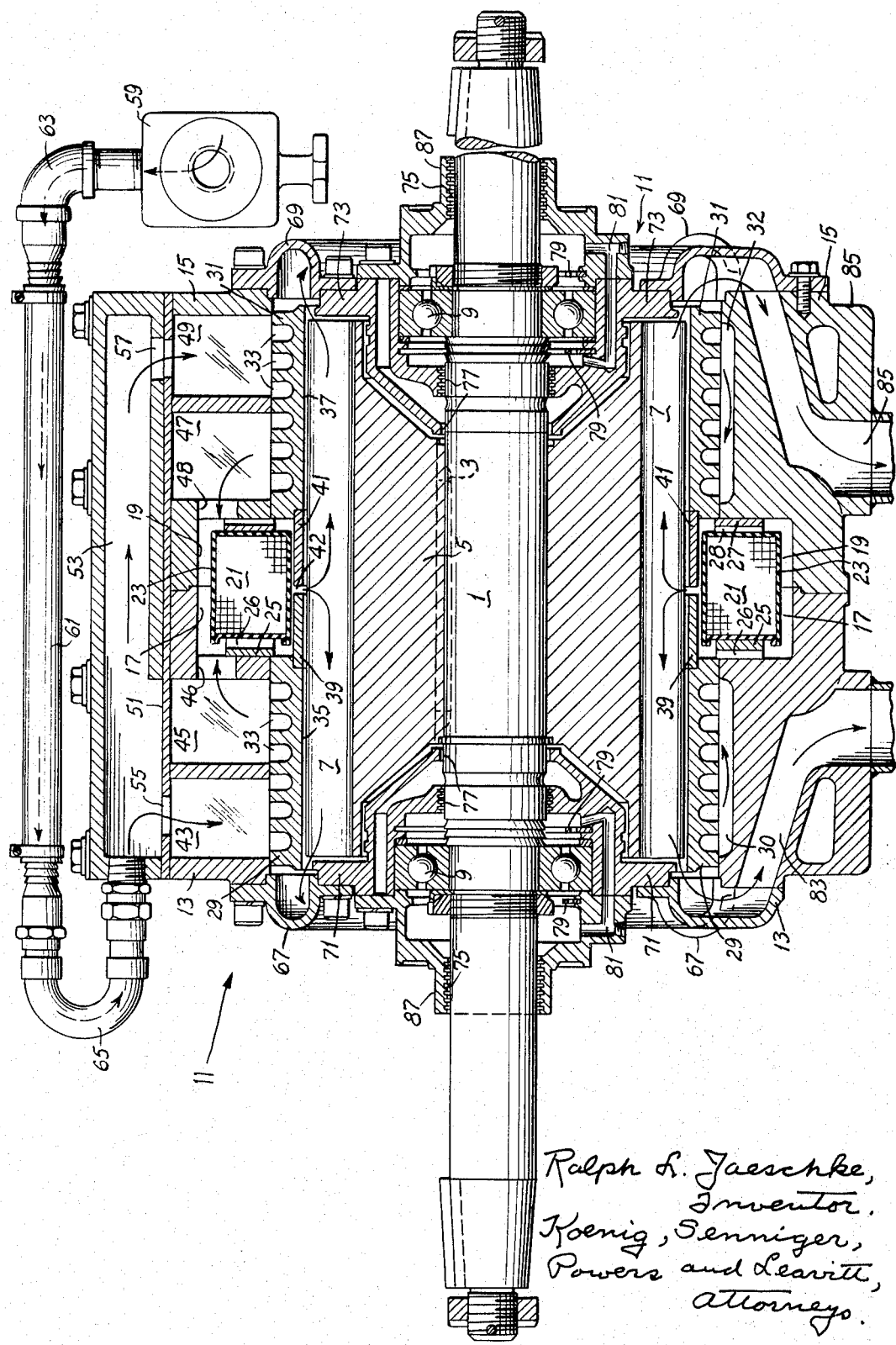

3,363,123
FLUID-COOLED EDDY-CURRENT
MACHINES
Ralph L. Jaeschke, Kenosha, Wis., assignor to Eaton Yale
& Towne Inc., a corporation of Ohio
Filed Aug. 28, 1964, Ser. No. 392,815
11 Claims. (Cl. 310—105)

ABSTRACT OF THE DISCLOSURE

A polarized rotor turning within a magnetizable stator generates eddy currents for energy absorption by heating internal surfaces in the stator. The stator carries a magnetizing coil. Heat at said internal surface, generated by eddy currents, is carried away by coolant circulating serially first through comparatively cooler passages in the stator behind said internal surface; second around the warmer coil; and third spirally over the hotter internal surface. Thus heat tansfer to the coolant as it warms occurs with minimal temperature gradients and stresses in the variously heated stator parts.

This invention relates to fluid-cooled eddy-current machines, and with regard to certain more specific features, to a liquid-cooling system for eddy-current dynamometers, brakes and the like.

Among the several objects of the invention may be noted the provision of a cooling system for eddy-current dynamometers, brakes and the like, whereby the power rating of such a machine of a given size may be substantially increased by decreasing destructive internal temperatures; the provision of a cooling system of the class described which reduces internal thermal stresses and eliminates or reduces occurrences of failures by fracture of eddy-current inductor drums of such machines; and the provision of a cooling system of the class described which requires only low-cost structural changes. Other objects and features will be in part apparent and in part pointed out hereinafter.

The invention accordingly comprises the elements and combinations of elements, features of construction, and arrangements of parts which will be exemplified in the structures hereinafter described, and the socpe of which will be indicated in the following claims.

In the accompanying drawings the single figure is an axial section taken through a dynamometer embodying the invention.

A dynamometer of the general class to which the invention pertains is shown, for example, in United States Patent 2,367,163. Such machines, through application of torque, provide means for measuring power and in the process convert mechanical energy into absorbed heat which must be carried away by a coolant. Such machines are rated according to the horsepower which they can absorb without damage. An important factor which limits the horsepower rating is the effectiveness of cooling of the eddy-current inductor drums. The effectiveness of any cooling system for the purpose depends in part upon maintenance of an extensive, evenly distributed temperature gradient throughout the drum areas which carry the eddy currents, for otherwise heat transfer to the coolant is limited and excessive differential thermal stresses are induced which result in troublesome fractured inductor rings. By means of the present invention a high rate of energy absorption is possible because there is maintained a high rate of heat dissipation, without inducing damaging stresses.

Referring now more particularly to the drawings, there is shown at numeral 1 a shaft, to either end of which may be attached a prime mover to be tested for power. Keyed to the shaft 1 as at 3 is a field-polarizing rotor 5, having peripherally spaced axially extending pole-forming teeth 7. These extend from end to end of rotor 5. The shaft 1 is carried in bearings 9 of a rockable inductor assembly indicated generally at 11. This is often referred to as a stator, even though it is mounted to rock, as will appear. In the case of an ordinary brake such an assembly would not rock. The assembly 11 comprises a housing composed of magnetizable ring sections 13 and 15. These sections are annularly recessed as shown at 17 and 19 for the reception therebetween of an annular field coil 21. The coil 21 is encased within a waterproof jacket 23 and is held in place between sections 13 and 15 by spacing rings 25 and 27. Rings 25 and 27 are intersected by passages 26 and 28, respectively. Bolts (not shown) in the usual manner hold together the sections 13 and 15.

Fitted into the ring sections 13 and 15 are magnetizable inductor sleeves 29 and 31, respectively. The sleeves or drums 29 and 31 are exteriorly grooved as shown at 33, to form circular coolant passages. The interior surface of each inductor drum 29 and 31 is cylindrical and is spaced a minimal distance from the outer portions of the pole-forming teeth 7 to form magnetic gaps 35 and 37. Between the inductor rings 29 and 31 are located rings 39 and 41, which are preferably nonmagnetizable. These rings 39 and 41 are spaced from one another to form a peripheral port 42 which connects the space around coil 21 with the gaps 35 and 37. Formed in the upper portions of the ring sections 13 and 15 is a row of passages 43, 45, 47 and 49, enclosed by a cover 51, above which is a longitudinal inlet manifold 53. Passage 45 is connected with the space 17, 19 around coil 21 by a lateral port 46. Passage 47 is connected with the space 17, 19 around coil 21 by a lateral port 48. The manifold 53 communicates with passage 43 via port 55 and with passage 49 via port 57. At 59 is shown a water inlet connected to one end of a flexible hose 61 via an L-connection 63. The other end of the hose 61 is connected with the manifold 53 by a U-connection 65. Flexibility of the hose 61 accommodates rocking movements of the assembly 11.

Bolted to the outer ends of the ring sections 13 and 15 are annular collector manifolds 67 and 69, respectively. Bolted interiorly to the manifolds 67 and 69 are supports 71 and 73, respectively, in which are the outer races of the bearings 9. The inner races of these bearings are carried by the shaft 1. Each of supports 71 and 73 has bolted to it a port which forms a trunnion 87. Suitable labyrinth seals are located at 75 and 77. Oil dams are shown at 79 and bearing vents at 81. The lower portion of manifold 67 forms a connection with an outlet drain passage 83. Likewise, the lower portion of manifold 69 forms a connection with a drain passage 85.

As is usual, the inductor assembly 11 of a dynamometer is mounted for some rocking movement on the trunnions 87 provided for the purpose. The stationary supports and bearings for the trunnions 87 are not shown, nor any of the torque-measuring equipment associated with the inductor assembly 11, these being well known to those skilled in the art. Well known also is the circuitry for exciting coil 21, whereby a toroidal flux field may be established interlinking the rotor 5 and the inductor assembly 11, this field being polarized by the teeth 7. When the rotor 5 is turned, the sweep of the polarized field induces eddy currents at the inner surfaces of the inductor sleeves 29 and 31. These eddy currents produce magnetic fields which react with the polarized field to transmit torque from the rotor 5 to the inductor assembly 11. The eddy currents are strongest close to the inner surfaces of the drums 29 and 31 and these surfaces become the most highly heated parts of the machine. It is this heat which must be effectively carried away without drum damage. The coolant (usually water) circulation is as indicated in a broad sense by the darts. Water flows from the inlet 59 through the hose 61 to the manifold 53, from whence it enters the passages 43 and 49 through the ports 55 and 57, respectively. Split currents of coolant then proceed semicircularly downwardly and around the outer ends of the sleeves 29 and 31, passing through the outer three grooves 33 in each.

Under the sleeves 29 and 31 flow is directed toward the center of the machine through cross passages 30 and 32, provided in the parts 13 and 15, respectively. Upward split semicircular flow then occurs around the next inward sets of passages 33 adjacent coil 21, which brings the coolant up into the innermost upper passages 45 and 47 next to the coil 21. From passages 45 and 47 flow enters the space 17, 19 around coil 21 through ports 46 and 48. This cools coil 21. The coolant then escapes from this space 17, 19 through the central annular port 43 and into the central space between the teeth 7. From this point the coolant is slung outwardly by the teeth with centrifugal force and against the inside of the surfaces of the inductor sleeves 29 and 31. The general movement is in opposite directions through the gaps 35 and 37 for eventual movement into the manifold rings 67 and 69. Since the flow of water through the magnetic gaps 35 and 37 has both axial and peripheral components of movement, there will be opposite helical flows from the slot 43 toward the manifolds 67 and 69. In the manifolds 67 and 69 the coolant gravitates into the drain passages 83 and 85.

In a conventional machine which was modified according to the invention so as to produce the coolant flow above described, the power that could be absorbed without danger of cracking of the sleeves 35 and 37 was increased from 250 horsepower to 900 horsepower, with reduced internal temperatures. The reason for this improvement appears to be as follows. The hottest parts of the inductor sleeves 29 and 31 are immediately adjacent their inner faces at the magnetic gaps 35 and 37. At the grooves 33 they are somewhat cooler, although hot. The coldest coolant which has downward and upward split semicircular flows around the opposite ends of the sleeves 29 and 31 is adjacent the outer coolest parts of the sleeves heated by the eddy currents. This maintains an effective but not excessive temperature gradient for heat transfer to the coolant in the grooves 33. When the water enters the space 17, 19 around coil 21, it has picked up some heat, but not all of which it is capable of absorbing. A cooling effect is therefore had upon the coil 21. The water escaping from the annular slot 42, while warm, is still capable of picking up additional heat as it spirals outwardly through the gaps 35 and 37 in contact with the highly heated inside surfaces of sleeves 29 and 31. Therefore again an effective but not excessive temperautre gradient is maintained for transferring heat to the coolant in the gaps 35 and 37.

It will be apparent that the cooler inlet water by split flows contacts the cooler outer portions of the sleeves 29 and 31 in the bottoms of the grooves 33, and the spiraling warmer water runs over the hotter inner surfaces of the sleeves 29 and 31. Thus there is minimized the generation of unduly high destructive temperature gradients in the sleeves 29 and 31. The temperature gradients are kept from becoming excessively high at localized points. Hence thermal stresses are minimized, with the resulting reduction in sleeve cracking for a given size of machine operating at a given capacity.

While the invention has been described as having particular applicability to eddy-current dynamometers, it will be understood from the above that its principles are applicable to other eddy-current machines.

While the inductor drums or sleeves 29, 31 are shown as inserts in the sections 13 and 15, it will be understood that they may be integrated parts thereof, the various coolant passages being appropriately cored out. The term "eddy-current drums" for those portions in which eddy currents are induced are to be understood to apply to the latter case in the claims. Reference to first, second and third pairs of passages for circulation are to passages (43, 49), (30, 32) and (45, 46, including ports 47 and 48), respectively.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Eddy-current apparatus comprising an inductor assembly having a coolant inlet, a coolant outlet and an annular space, an annular field coil in said annular space, a circular inductor part adjacent the field coil, said inductor part being surrounded by at least one annular passage, a pole-forming rotor within said inductor part and forming a magnetizable gap therewith, peripherally disposed port means between said annular coil-containing space and said gap, said coolant inlet being connected with said annular passage around the inductor part for flow around the inductor part, at least one port for receiving coolant from said flow and directing it into the space containing the coil and out of said peripherally disposed port means for spiral flow axially along the inductor part in response to centrifugal action of the poles of the rotor on the coolant, and a collector manifold at an end of the inductor part for receiving the spiral flow therefrom for delivery to said coolant outlet.

2. Eddy-current apparatus comprising an inductor assembly having a coolant inlet, a coolant outlet and an annular space, an annular field coil in said annular space, an inductor drum adjacent the field coil, said drum being surrounded by at least one annular passage, a pole-forming rotor within said drum and forming a magnetizable gap therewith, peripherally disposed port means between said annular coil-containing space and said gap, said coolant inlet being connected with said annular passage around the drum for split flow around the drum, at least one port for rejoining said split flow and directing it into the space containing the coil for subsequent movement out of said peripherally disposed port means for spiral flow axially along the rotor in response to centrifugal action of the rotor on the coolant, and a collector manifold at an end of the drum for receiving the spiral flow therefrom for delivery to said coolant outlet.

3. Eddy-current apparatus comprising an inductor assembly having a coolant inlet, a coolant outlet and an annular space, an annular field coil in said annular space, an inductor drum having one end adjacent the field coil and its other end spaced therefrom, said drum being surrounded by annular passages, a pole-carrying rotor rotatable within said drum and forming a magnetizable gap therein, peripherally disposed port means between said annular coil-containing space and an adjacent part of said gap, said coolant inlet being connected with certain of said annular passages for split flow around the end of the drum which is spaced from the coil, said assembly including a passage for reconnecting the split flow and directing it for a second split flow through others of said passages nearer the coil, at least one port for reconnecting the second split flow and directing it into the space containing the coil for subsequent movement out of said peripherally disposed port means for spiral flow axially through the gap and away from the coil in response to centrifugal action of the rotor on the coolant, and a collector manifold at an end of the drum for receiving the spiral flow therefrom for delivery to said coolant outlet.

4. Eddy-current apparatus comprising an inductor assembly having an annular space and an annular field coil in said space, inductor drums flanking said coil and extending oppositely therefrom, each of said drums being surrounded by annular passages, a pole-carrying rotor rotatable within said drums and forming magnetizable gaps therewith, peripherally disposed port means between said annular coil-containing space and the parts of said gaps adjacent the coil, said assembly having a first pair of coolant inlet connecting passages leading to distant ones of said annular passages for split flows around the end portions of the drums which are distant from the coil, said assembly including a second pair of passages for reconnecting said split flows and directing them for additional split flows through others of said passages nearer the coil, a third pair of passages located on opposite sides of the coils for reconnecting the additional split flows and directing them into the space containing the coil for subsequent movement out of said peripheral port means for opposite spiral flows through said gaps away from the coil in response to centrifugal action of the rotor on the coolant, and collector manifolds at the ends of the drums for receiving the spiral flows from the ends of the gaps which are distant from the coil for delivery from the apparatus.

5. Apparatus according to claim 4, wherein the axis of the apparatus is horizontal, said first pair of connecting passages is above the drums, said second pair of passages is below the drums and said third pair of passages is above the drums.

6. Eddy-current apparatus comprising an inductor assembly having coolant inlet and outlet passages and an annular space containing an annular field coil, eddy-current inductor drums flanking the field coil and having exterior grooves, means between said drums forming peripheral outlet means from said annular space, a pole-carrying rotor rotatable within said drums and forming magnetizable gaps within said drums, said coolant inlet passages being connected with outer groups of said grooves distant from the coil for split flows around the sleeves, said assembly having cross passages for carrying coolant from said split flows to opposite split flows through inner groups of said grooves which are closer to said coil than said outer groups of grooves, passages for directing said last-named flows into the space containing the coil and out of said peripheral outlet means for subsequent opposite spiral flows axially along the gaps in response to centrifugal action of the poles of the rotor on the coolant, and collector manifolds at the opposite ends of the rotor for receiving the spiral flows from said gaps for delivery to said coolant outlet passages.

7. Eddy-current apparatus comprising a housing having an interior generally cylindrical form, outer and inner pairs of radial coolant passages in the housing, coolant inlet connections to the outer coolant passages, inductor drums having exterior grooves and located within said cylindrical form, outer and inner groups of grooves in the sleeves communicating with said outer and inner pairs of radial passages respectively, passages in the housing between those groups of said grooves which communicate with the outer pair of passages and those which communicate with the inner pair of passages, said housing having an annular space located between the inner pair of passages, an annular field coil in said annular space, a rotary polar field member within the sleeves and forming magnetizable gaps within the drums, said annular space having annularly arranged passage means connecting it with said gaps, collector manifolds on the housing at those ends of said sleeves which are spaced from the coil for receiving coolant from said gaps, said housing having coolant outlet passages extending from said collector manifolds.

8. Eddy-current apparatus comprising a housing having an interior horizontal generally cylindrical form, outer and inner collinearly arranged radial coolant passages on the top of the housing, an inlet manifold on the housing forming coolant inlet connections with the outer passages, inductor sleeves having exterior grooves and located within said cylindrical form, outer grooves in the sleeves communicating with said outer passages and inner grooves communicating with the inner passages, passages in the bottom portion of the housing between said outer and inner grooves, said housing having an annular space between said inner radial passages, an annular field coil in said annular space, a rotary polar field member within the sleeves and forming magnetizable gaps therewith on opposite sides of the coil, said annular space having a circular slot connecting it with said magnetizable gaps, collector manifolds on the housing at those ends of said sleeves which are spaced from the coil for receiving coolant from said gaps, said housing having coolant outlet passages extending from said collector manifolds.

9. Eddy-current apparatus comprising a hollow substantially horizontal housing having a central annular space, an annular field coil in said space, drums having exterior grooves and located within the hollow of the housing and flanking said space, a rotor within the drums forming magnetizable gaps therewith, said annular space having peripherally disposed port means connecting it with said gaps, an inner pair of coolant passages in said housing flanking and connected with said annular space for receiving coolant from inner groups of said grooves of the drums, an outer pair of inlet coolant passages flanking said inner pair of coolant passages for delivering coolant to outer groups of said grooves of the drums, coolant inlets for said outer pair of inlet passages, said housing having additional connecting passages each of which connects an outer set of grooves with an inner set of grooves, and collector manifolds on the housing at the outer ends of the sleeves for receiving coolant from said gaps.

10. Apparatus according to claim 9, wherein said inner and outer pairs of coolant passages are located substantially collinearly on top of the housing, and wherein said additional connecting passages are located substantially in line with one another on the bottom of the housing and substantially in the plane of the collinear passages.

11. Apparatus according to claim 10, including an inlet manifold extending over said collinear passages.

References Cited
UNITED STATES PATENTS

| | | | |
|---|---|---|---|
| 2,367,163 | 1/1945 | Winther | 310—93 |
| 3,089,045 | 5/1963 | Derks | 310—105 |
| 3,303,368 | 2/1967 | Cohen et al. | 310—105 |

ROBERT K. SCHAEFER, *Primary Examiner.*

H. O. JONES, *Assistant Examiner.*